INVENTOR
Robert J. Parsons
BY
Lyman E. Dodge
ATTORNEY

Patented Aug. 4, 1936

2,049,747

UNITED STATES PATENT OFFICE 2,049,747

CIRCUIT CONTROLLER

Robert J. Parsons, Schenectady, N. Y., assignor to Consolidated Car Heating Company, Inc., Albany, N. Y., a corporation of New York Application December 19, 1933, Serial No. 703,038

1 Claim. (Cl. 200—16)

This invention relates to electricity, more especially to the control of electric circuits, and particularly to a device commonly known as a circuit controller.

A principal object of this invention is to produce an easily manufactured, rugged, convenient, easily maintained, durable, and easily disassembled and assembled device for controlling electrical circuits, operable either manually or by other means.

Other objects and advantages will appear as the description of the particular physical embodiment selected to illustrate the invention progresses, and the novel features will be particularly pointed out in the appended claim.

Figure 1:
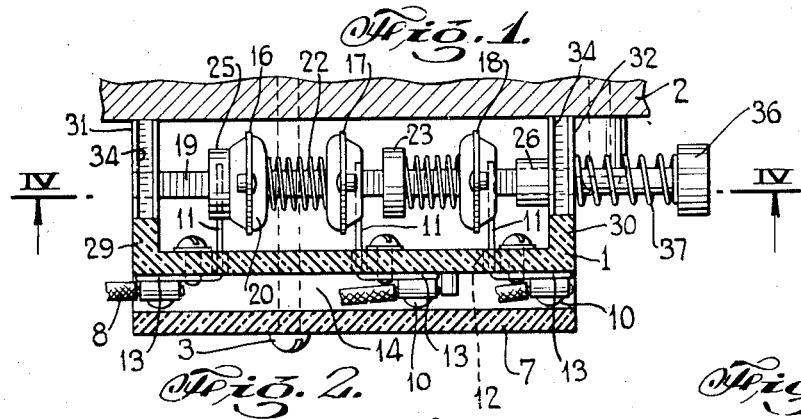
Figure 2:
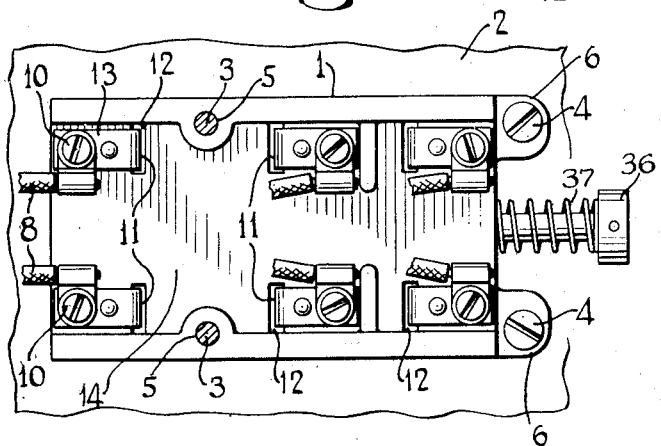
Figure 3:
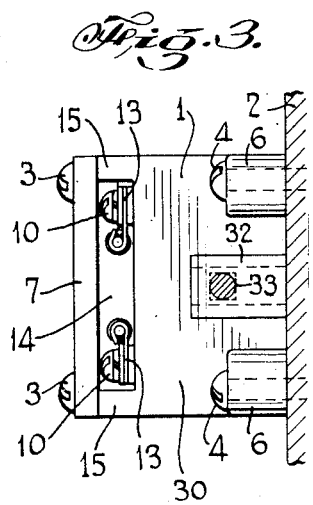
Figure 4:
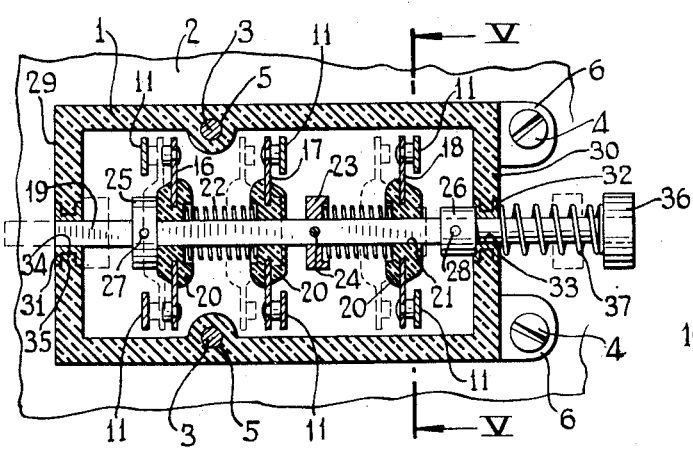
Figure 5:
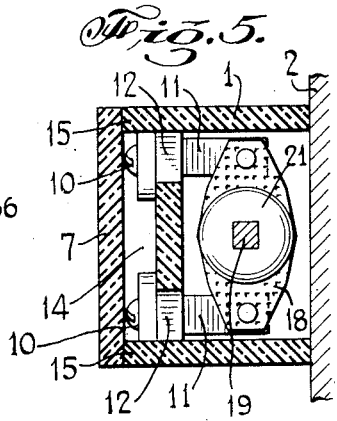

In describing the invention in detail and the particular physical embodiment selected to illustrate the invention, reference will be had to the accompanying drawing and the several views therein, in which like characters of reference designate corresponding parts throughout the several views, and in which:

Figure 1 is a cross-sectional plan view of a circuit controller embodying my invention; Fig. 2 is an elevational view of the device as shown by Fig. 1; Fig. 3 is an end view of the device as shown by Fig. 1 with some parts in section to more clearly illustrate the construction; Fig. 4 is a sectional view on the plane indicated by the line IV—IV of Fig. 1, viewed in the direction of the arrows at the ends of the line; Fig. 5 is a sectional view on the plane indicated by the line V—V of Fig. 4, viewed in the direction of the arrows at the ends of the line.

In the figures, numeral 1 designates substantially a hollow rectangular box which may be made of any proper or desirable material. It is preferred to make the box 1 of insulating material, preferably one of the phenolaldehyde condensation products or resins. By making the box wholly of insulating material, insulating of separate current carrying parts is obviated, because even the terminals of opposite electrical polarity may be mounted upon the structure, although it is to be understood that applicant's invention does not exclude a box made of noninsulating material in which suitable means are employed to properly insulate terminals of opposite polarity.

Applicant prefers to omit a cover for the open face of the box thereby diminishing the expense thereof, but it is to be understood that applicant does not exclude by this particular showing the use of a box with a cover.

Applicant contemplates mounting the box of his circuit controller as shown in Fig. 1, that is, attaching the box to a suitable plane surface of a structure at the place where the circuit controller is to be used. In Fig. 1 the suitable plane surface is indicated as 2, and takes the place of a cover for the box. The mounting means may be any suitable means, but applicant prefers to employ screws as 3 and 4. The screws 3 are passed through the bores 5 in the side walls of the box. The screws 4 are passed through ears 6 formed integral with the box. Applicant prefers to use a cover plate 7 and in such case screws 3 would also pass through the cover plate 7.

Conductors, as 8, are mechanically and electrically connected to the several switch terminals, as 11, in any suitable and appropriate manner as by screws and clips 10, as it is preferred to make the clips 11 with a right angle therein with one leg, extending up into the box through slots, as 12, forming the switch terminal, and the other leg 13 lying in what is virtually a connection duct 14.

In order to provide a suitable space for conveniently connecting the conducting wires to the switch terminals, applicant prefers to have side wall extensions 15 on each side of the box, which with the duct covering plate 7 forms the duct 14. This form of construction is preferred, but it is to be understood that applicant does not mean to exclude other suitable and appropriate constructions forming a connection duct.

The switch terminals, as 11, are positioned to be cross-connected by bridging conductors as 16, 17 and 18 formed of electrical conducting material. The bridging conductors 16, 17 and 18, for the purpose of this invention, must be movable to contact the switch terminals, as 11 to break contact therewith. In order to accomplish this purpose, applicant mounts the bridging contacts 16, 17, and 18 upon a longitudinal movable actuating shaft. In order to insulate the several bridging conductors 16, 17, and 18, one from the other, applicant interposes insulating material 20 between each bridging conductor and the actuating shaft 19. In fact, in the preferred form as shown in the drawing, each of the bridging conductors 16, 17, and 18 is moulded into the insulating material 20, which is preferably a phenolaldehyde condensation product or resin. These insulating hubs are formed with bores, as 21, through which the operating shaft 19 extends. In order to prevent turning of the insulating hubs 20, the bore therethrough is made other than round. It is made to fit the shape of the shaft 19, which is made other than round. In the particular device shown, the shaft 19 is of square cross-section, although it is to be understood that any cross-section other than round or circular is in contemplation of applicant. It is also to be understood that applicant does not mean by the particular showing to exclude other structures equally serving the same purpose of preventing the bridging conductors 16, 17, and 18 from turning with respect to the operating shaft 19, because many forms of construction may be adopted for mounting bridging conductors, as 16, upon the shaft 19 which will function to prevent turning of one with respect to the other and at the same time allowing longitudinal movement of the shaft relative to the bridging conductors.

In order to connect and disconnect the switch terminals 11 on one side of the shaft 19 from those on the other side of the shaft, it is necessary to reciprocate bridging conductors as 16. This might be done by rigidly attaching the insulating hubs, as 20, directly to the shaft 19, but this would not provide a circuit controller, where a plurality of bridging conductors are used, which would provide a substantially uniform contact pressure between each of the bridging conductors and its associated switch terminals, and would furthermore, probably necessitate considerable fussing in getting each of the bridging conductors to cooperate suitably with each of the switch terminals. For these reasons, applicant mounts each of the hubs 20 resiliently upon the shaft 19, that is to say, each bridge contact is so mounted upon the shaft 19 that when it is moved against the switch terminals it is resiliently pressed thereagainst so that any slight mis-adjustment may be neglected without impairing the efficiency of the device. In order to obtain this resiliency, applicant, in the preferred form, mounts a helical spring 22 surrounding the shaft 19 with one end pressing against the insulating hub as 20. The other end of the helical spring 22 presses either against an adjacent insulating hub, as 20, or against a collar, 23, which is preferably pinned, as by pin 24, to the shaft 19.

Although applicant desires to have the bridging conductors, as 16, resiliently pressed against the switch terminals, as 11, in order to make contact, he desires a positive means to move the bridging contacts out of contact with the switch terminals. This positive movement is secured by the collars, as 23, 25, and 26. Collar 25, pinned to the shaft 19 by pin 27, positively moves bridging conductor 16; collar 23 positively moves bridging conductor 17; and collar 26, pinned by pin 28 to the shaft 19, positively moves bridging conductor 18.

From the hereinbefore given description, it will be understood that shaft 19 when moved longitudinally from the position as shown in Fig. 4 serves to separate bridging conductor 18 from its terminals; bridging conductor 17 from its terminals; and bridging conductor 16 to connect with its terminals. The operation of a bridging conductor to connect or disconnect with its terminals depends entirely upon its method of mounting. All of the bridging conductors may normally make contact with their terminals, and all be disconnected therefrom upon a movement of the operating shaft 19; or all of the bridging conductors may be normally separated from their terminals and be connected thereto upon a movement of the operating shaft 19; or any desired combination of normally open or normally closed bridging conductors may be used.

If the shaft 19 were journaled directly in the end walls 29 and 30 of the switch box 1, it would be necessary to assemble the various bridging conductors, as 16; helical springs as 22; and collars as 23, 25, and 26 while they were being held down in the box 1. This would be extremely awkward and in any case a time consuming operation. In order to avoid this difficulty, applicant mounts the shaft 19 in shaft supports 31 and 32, each formed with an orifice, as 33, therefor conforming to the shape of the shaft. The shaft supports 31 and 32 are formed so as to be removable from the end walls 29 and 30. This may be done in any suitable and appropriate manner, but applicant prefers to form cooperating inter-engaging parts between the shaft supports 31 and 32 and the end walls 29 and 30. As shown in Fig. 4, each shaft support is formed with a channel, as 34, cooperating with a rib, as 35. By this means, the shaft supports 31 and 32 together with the shaft 19 and all of the parts carried thereby may be lifted bodily from connection with the box 1 and then all of the collars, springs, and bridging conductors may be mounted thereon with facility and celerity and thereafter conveniently replaced, as shown in the figures.

The ability to withdraw shaft 19 and its associated parts from the box not only assists in assembling the shaft 19 and its parts, but also allows a more ready adjustment of the members, as 11, within the box.

In order to give a longitudinal movement to the shaft 19, applicant provides an operating button 36 suitably rigidly attached to the shaft 19. By pressure applied to this button 36, either manually or by any appropriate part of a moving body, the shaft 19 is moved longitudinally. As applicant desires the automatic return of the shaft 19 to a normal position, a spring 37 is interposed between the end wall 30, or shaft support 32, and the button 36 which serves to return the shaft 19 to normal position, as shown in Fig. 4, when the pressure upon button 36 is removed.

Although I have particularly described one particular physical embodiment of my invention and explained the principle and operation thereof, nevertheless, I desire to have it understood that the form selected is merely illustrative, but does not exhaust the possible physical embodiments of the idea of means underlying my invention.

What I claim as new and desire to secure by Letters Patent of the United States, is:

In a switch circuit controller, in combination: a box comprising walls enclosing a space with the exception of one side, two of the walls at opposite ends of said open side being formed with straight-sided slots, said open side being adapted to be closed by the structure to which said controller is attached; switch terminals positioned within the space; bridging conductors for cooperation with the switch terminals; a shaft upon which the bridging conductors are mounted; shaft-supports in which the shaft is journalled, said shaft-supports engaging slidingly the straight walls of said slots, whereby the shaft, its supports and associated bridging conductors, assembled separately from the box, may be introduced slidingly as a unitary structure into, and removed from, the space, the supports remaining fitted within said straight-sided slots when said controller is separate from the supporting structure, said assembly being held positively within said slots when the open side abuts against the supporting structure; the side walls of said box opposite and remote from said open side having extensions defining and partly enclosing a duct provided with a plurality of conductor-receiving terminals; a removable duct-covering plate leaving a space for exit of said conductors at the end of said duct between said extension walls; a first screw means adapted to secure said box to a supporting surface independently of the securement of said cover-plate; and a second screw-means transfixing said plate and walls and adapted to enter into said supporting surface, the removal of said second screw-means permitting the removal of said cover-plate while said conductors remain connected, and said controller including said shaft assembly, being then adapted to be freed, by removal of said first screw-means, for separation from the supporting structure, while the connection with said conductors is still maintained, the shaft assembly being then removable readily from the space while the controller and conductors remain interconnected.

ROBERT J. PARSONS.